Sept. 17, 1946.　　　　M. FUCHS　　　　2,407,659
PHASE COMPARISON SYSTEM
Filed Feb. 17, 1945
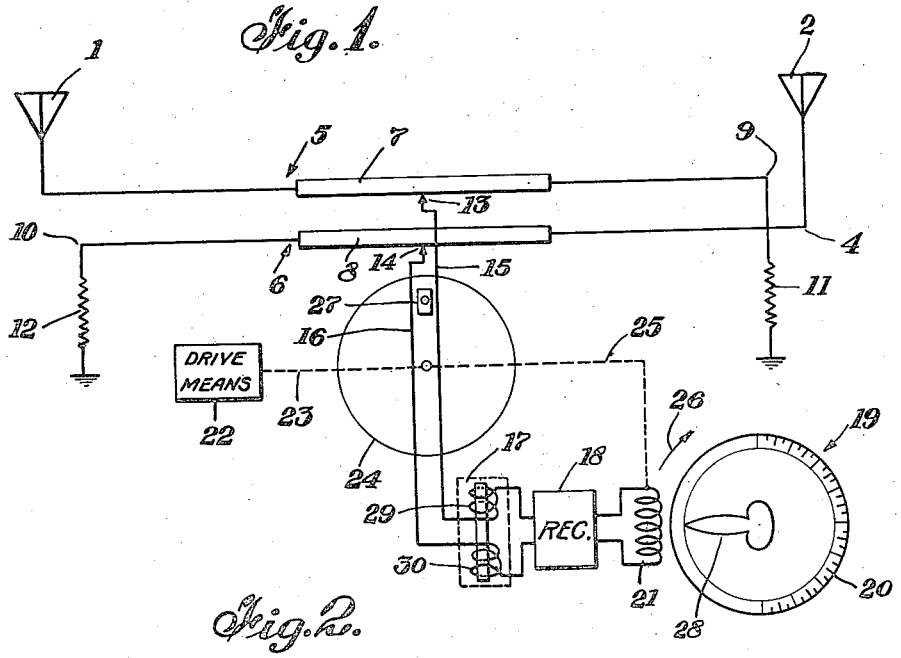
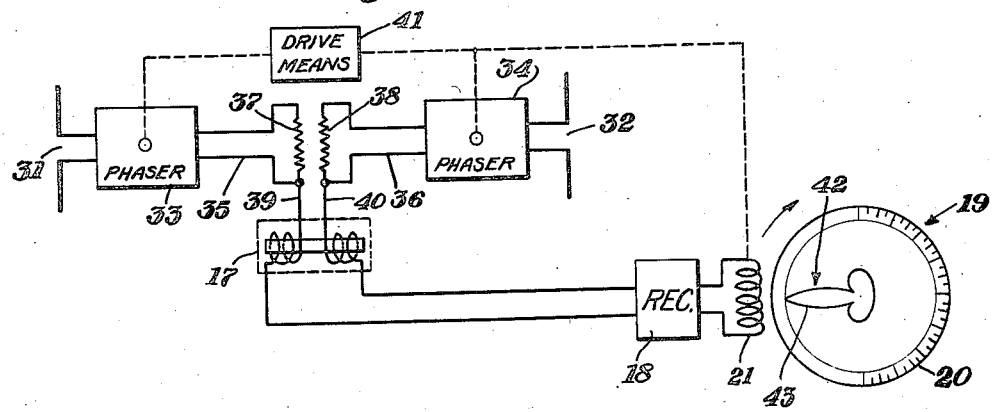
INVENTOR.
MORTON FUCHS
BY
ATTORNEY

UNITED STATES PATENT OFFICE 2,407,659

PHASE COMPARISON SYSTEM

Morton Fuchs, New York, N. Y., assignor to Federal Telephone and Radio Corporation, New York, N. Y., a corporation of Delaware Application February 17, 1945, Serial No. 578,491

12 Claims. (Cl. 250—11)

This invention relates to phase comparison systems, particularly those adapted to be used for direction finding purposes.

In directionally shiftable radiant acting systems, used either as direction finders or as rotary beacons, systems have been proposed wherein the directive pattern is shifted through a predetermined angular relationship by means of a phase shifting network shifting the phase relationship of two or more radiant acting means with respect to a given translating device, such as a transmitter or a receiver. In certain of such systems, transmission lines (usually artificial) are coupled to antennas, and the direction finding receiver is coupled to said transmission lines at continuously shifting points along said lines to produce effective shifting of the phase and consequently of the radiant action patterns of said antennas without requiring physical movement thereof.

An object of the present invention is the provision of an improved shiftable radiant acting system, such as for example of the types hereinabove described.

When such systems are used in direction finders they require an excellent match between the phase shifting transmission lines and their terminations in order to obtain an electrically flat line along which the phase varies linearly. When the antennas coupled to the said lines also serve as terminating impedances, it becomes necessary to match the antennas with the lines. A system of this type is described in the copending application of N. Marchand, Serial No. 553,562, filed September 11, 1944.

Another object of the present invention is a provision of an improved phase comparison direction finding system in which the antennas do not have to match the transmission lines.

Another object of the present invention is the provision of an improved phase comparison direction finding system which uses matching resistive loads to terminate the transmission lines.

Phase comparison direction finders using matching resistive loads to terminate the transmission lines have not heretofore proven satisfactory. Direction indications have been obscure and inaccurate. I have discovered this to be due to the fact that the direction finding receiver draws current from the transmission lines. This alters the impedance of the lines, causing a mismatch and producing reflections and standing waves. It also unbalances the lines in relation to each other. Consequently, instead of a linear shift of phase along the lines, the phase shift becomes erratic and uncontrollable and it becomes impossible to correlate and synchronize the indicating device of the direction finding receiver with the consequently irregular shifting of the maximum or null of the resulting radiant action pattern.

Another object of the present invention is the provision of a phase comparison direction finding system using matched resistive load terminations for the transmission lines along which lines coupling of the receiver to successive points produces corresponding shifts in directions of the nulls of the radiant action patterns.

Ideally the foregoing object is accomplished, according to my invention, by having the means coupling the transmission lines to the direction finding receiver offer infinite impedance to current from said lines at the nulls, that is, when the voltages at the coupling points of each of the transmission lines are in phase and equal. Under null conditions no current will be drawn from the lines, the lines remain flat and the null points on the line are accurately and regularly spaced and clear.

When such voltages are unequal and/or out of phase said means preferably offers moderate resistive impedance and good power transfer. Under this condition the flow of current from the transmission line to the direction finding receiver both mismatches and unbalances the transmission lines of the system. While this affects the rest of the radiation pattern, it is unimportant when the null is being used to determine direction.

While the conditions described above are ideal, satisfactory results are obtained when said conditions are only approximated. When the voltages are in phase and equal it is sufficient if the impedance of the coupling means be relatively great compared with that of the transmission lines. When the voltages are not in phase it is desirable that the impedance of the coupling means become less.

Another object of the present invention is the provision in such a system of receiver coupling means which present an impedance large in relation to the impedance of the transmission lines when the voltages at the coupling points are in a predetermined phase and amplitude relationship and which present lesser impedances when said voltages differ from said phase relationship.

According to a feature of my invention I connect two spaced antenna units to one end respectively of two separate transmission lines and terminate the other ends of said lines in matching resistive impedances. The transmission lines are coupled to a translating apparatus. Means are provided in association with the transmission lines for varying the phase of the energy transferred between the translating apparatus and the two antennas. In one embodiment this is accomplished by varying the points on the transmission lines to which the translating apparatus is coupled. In another embodiment this is accomplished by providing phasers intermediate the antennas and the transmission lines coupled to the translating apparatus.

In accordance with my invention I interpose a circuit means between the translating apparatus and the transmission lines whose impedance varies in accordance with the voltage conditions prevailing at the coupling points on said transmission lines. When said voltages are of a predetermined phase and amplitude relationship the impedance of said circuit means is relatively great compared to the impedance of the transmission lines. When said voltages differ from this phase relationship said impedance is less. In the output of the translator arrangement an indicator may be provided producing a trace line positioned in accordance with the positioning of the phase control means. The output energy from the translating device may be applied to the indicator to produce deflection of the trace in accordance with the strength of the signals. The phase shifting is preferably made to occur in the form of a sine wave so that directional shifting of the radiant action pattern is made at a uniform rate and the indicator calibration may then be made of a uniform or straight line scale and will remain in proper calibration for all received frequencies.

In the system hereinabove described it is not necessary that the impedances of the antennas match the impedances of the transmission lines. Because of the relatively high impedance of the circuit means when the voltages at the coupling points are at a predetermined amplitude and phase relationship, at such phase relationship relatively little current will flow from the transmission lines and since said transmission lines are terminated in matching resistive impedances said lines will be flat and consequently said phase relationship will occur at predetermined points on the transmission lines bearing a fixed relationship to the direction of the null of the radiant action pattern of the antennas. Thus accurate directional indications will be obtained on the indicator.

A better understanding of my invention and the objects and features thereof may be had from the following particular description thereof made with reference to the accompanying drawing in which:

Fig. 1 is a block diagram of a simple direction finding receiver unit operating in accordance with the principles of my invention.

Fig. 2 is a modified arrangement of the direction finding receiver unit illustrated in Fig. 1.

Turning first to Fig. 1, two radiant energy means, for example antennas 1 and 2 are separated a given distance preferably less than 180 electrical degrees. Antennas 1 and 2 are coupled by any suitable means to ends 3 and 4 respectively of transmission lines 5 and 6. Said transmission lines 5 and 6 may be comprised entirely of regular transmission lines or may each consist in part of a transmission line and in part of artificial transmission lines 7 and 8 respectively. The other ends 9 and 10 of transmission lines 5 and 6 are each connected in series with one of two matching resistive impedances 11 and 12 which latter are in turn connected to ground. Since the sharpest indication of direction is produced by a null indication I arrange the lines in the manner indicated in the drawing so that at the midpoints of artificial lines 7 and 8 there will normally be a zero or null providing the signal is approaching at right angles to the plane defined by the antenna systems. If the energy arrives at some other angle, so that antennas 1 and 2 are not energized in phase, the null will occur at some other point along the lines. Artificial lines 7 and 8 are arranged midway between the ends of transmission lines 5 and 6 and serve together with movable contacts 13 and 14 respectively as phase shifting networks. Contacts 13 and 14 are arranged to move together along their respective artificial lines and are coupled to said lines. Artificial lines 7 and 8 are preferably made electrically equal to the spacing between antennas 1 and 2 so that a complete effective rotation of the directive action of the system may be obtained. Contacts 13 and 14 are connected over coupling lines 15 and 16 respectively to a circuit means 17, hereinafter described, which in turn is connected to a receiver 18 in the output of which is provided an indicator 19. Preferably, indicator 19 is some form of visual indicator arrangement such as a cathode ray tube 20 provided with deflecting means such as a coil 21. Drive means 22, which may for example be a motor, is coupled over a shaft 23 to a driving wheel 24 and over a shaft 25 to a control means indicated by arrow 26 for rotating deflection coil means 21 about the cathode ray tube 20. Mounted on wheel 24 is crank 27 which serves during rotation of wheel 24 to shift contacts 13 and 14 regularly backward and forward along artificial lines 7 and 8 respectively. If drive means 22 operates continuously at a given speed, contacts 13 and 14 will travel back and forth along their respective artificial lines at a speed corresponding to a simple harmonic motion or sinusoidally. Accordingly, the phase angle of the energy transferred from antennas 1 and 2 to the receiver 18 will continuously be varied providing the phase shift along the artificial lines is regular, which in turn depends on the lines being electrically flat. Assuming for the moment that the lines are flat, the aforementioned operation will provide an output in the form of a sine wave so that effective regular rotation of the directive action of the pattern from antennas 1 and 2 will thus be effected. Since coil 21 rotates in synchronism with the movement of contacts 13 and 14, radial deflection of the cathode ray beam will be made in accordance with the incoming signal energy so that a pattern 28 dependent upon the direction of a transmission station will be traced on the screen of the cathode ray tube. Since the displacement is linear upon the cathode ray screen a permanent calibration may be provided. With the relationship outlined, indications will be uniform for all frequencies received.

In systems of the type described the instantaneous angular position of the trace in cathode ray tube 20 corresponds to a given position of contacts 13 and 14 along artificial lines 7 and 8 respectively. Likewise, providing the artificial lines are electrically flat, the instantaneous position of contacts 13 and 14 would correspond with a given direction of the resultant radiant action pattern. Under such conditions rotation of driving wheel 24 would correspondingly rotate the trace of cathode ray tube 20 and the radiant action pattern, thus enabling obtaining of accurate directional indications.

Since the present direction finding receiver is of the null type it is primarily the direction of the null of the directional pattern and not the position of the rest of said pattern which must correspond with given positions of contacts 13 and 14.

If artificial lines 7 and 8 are electrically flat and energy is received from a given direction at a given point along artificial lines 7 and 8, voltages appear equal in amplitude and corresponding in phase. Said point is herein termed a null point. If the lines remain flat and the direction from which energy is received is varied, the null point will correspondingly vary. As will be apparent however, if said lines are not flat the direction of the null will not correspond to any given position of the contacts 13 and 14 because of the effect of the standing waves which will alter the phase shift along said lines. As has been stated hereinbefore the lines lose their flatness when current is drawn from said lines by the receiver.

In accordance with my invention circuit means 17 are adapted to prevent the drawing of any substantial amount of current by the receiver when contacts 13 and 14 are at a null point, that is, when the voltages at a given point on artificial lines 7 and 8 are equal and in phase.

This is accomplished by arranging coupling lines 15 and 16 each in series with coils 29 and 30 respectively of circuit means 17. Coils 29 and 30 may be arranged on a single form with or without a core of magnetic material depending on the frequencies involved. Coils 29 and 30 are as closely coupled as possible and are arranged so that when voltages, equal and in phase, appear at contacts 13 and 14, the resultant currents flowing through coils 29 and 30 produce fields in said coils reenforcing each other. Thus the effective inductance of each of said coils is increased, thereby increasing the effective impedance of said coils. Coils 29 and 30 are provided with a sufficient number of turns so that the resultant impedances under such conditions are sufficient to prevent receiver 18 from drawing any substantial amount of current from artificial lines 7 and 8 and consequently said lines are then substantially electrically flat.

From the foregoing it will be seen that for any given direction from which energy is received the artificial lines will become flat when contacts 13 and 14 reach a point corresponding to the null. Thus the indication of the null on cathode ray tube 20 will correspond with a given direction from which energy is being received.

Circuit means 17 will obviously offer less impedance to the transfer of energy between artificial lines 7 and 8 when the voltages at contacts 13 and 14 are out of phase since the resultant current flow through coils 29 and 30 will not produce fields of the same magnitude as are produced under null conditions. Consequently the transfer of current from artificial lines 7 and 8 will in all probability set up standing waves on said lines at other than the null points, but since the null is being used for direction indications this fact does not interfere with accurate operation of the system.

Referring now to Fig. 2, another system embodying my invention is there disclosed. The antenna elements may consist of dipoles 31 and 32 which are coupled to variable phasers of any suitable type 33 and 34 respectively. Said phasers are in turn connected to transmission lines 35 and 36 which terminate in matching resistive impedances 37 and 38 respectively. One end of the impedances 37 and 38 is coupled by means of lines 39 and 40 to circuit means 17 similar to that described in connection with Fig. 1, circuit means 17 being in turn connected to receiver 18 whose output is applied to indicator 19 of cathode ray tube 20. Deflecting coil 21 of tube 20 is driven by a driving means 41 which also synchronously varies phasers 33 and 34. Operation of the driving means changes the phase of the voltages appearing on lines 39 and 40 in relation to antennas 31 and 32 and consequently rotates the null of the radiant action pattern of said antennas. At the same time driving means 41, rotating deflection coil 21, thereby correspondingly rotates the trace of cathode ray tube 20. A trace 42 such as illustrated may be produced, with the point 43 thereof, produced in response to equal and in phase voltages at lines 39 and 40 and corresponding to the null, indicating the direction from which energy is being received.

While I have described the details of two embodiments of my invention it is to be understood that variations may be made in such details as will be apparent to those versed in the art without departing from the teachings thereof. For example, various different types of antennas and driving means may be employed. Moreover, while my invention is particularly adapted for use in phase comparison direction finders, the principles thereof may be applied to provide phase comparison indications for other purposes. While I have shown one circuit means, namely the coupled coils 29 and 30 which are adapted to present maximum impedance to currents resulting from equal and in phase voltages, it is to be understood that other devices for this purpose may be employed. Instead of contacts 13 and 14, other coupling means, such as capacitive coupling, may be employed. Therefore it should be distinctly understood that these illustrations of my invention are given merely by way of example and not as a limitation on my invention as set forth in the objects thereof and the accompanying claims.

What is claimed is:

1. A system for comparing the varying phase of voltages present on respective transmission lines said lines terminating in their characteristic impedances, comprising, a translating device, circuit means coupling said transmission lines to said device, said circuit means having an input impedance relatively large compared to the transmission line impedance to voltages having a predetermined amplitude and phase relationship at the points at which said circuit means is coupled to the transmission lines and having a lesser input impedance to voltages at said points differing from said predetermined phase relationship, and means for variably controlling the phase of energy transferred between said lines and said circuit means.

2. A system according to claim 1, wherein the said coupling means includes a pair of closely coupled coils serially connected respectively with said transmission lines and providing reinforcing fields in response to equal in phase voltages in said transmission lines.

3. A system for indicating the relative phase of energy in two sources comprising a translating device, means for coupling said sources to said translating device comprising a pair of transmission lines each coupled to one of said sources, matching impedances terminating each of said transmission lines, circuit means coupling said transmission lines to said device, said circuit means having an input impedance relatively large compared to the transmission line impedance to voltages having a predetermined amplitude and phase relationship at the points at which said circuit means is coupled to the transmission lines and having a lesser input impedance to voltages at said points differing from said predetermined phase relationship, and means for variably controlling the phase of energy transferred between said circuit means and said two sources.

4. In a directional shiftable radiant acting system including two spaced radiant acting means and a radiant energy translating device, means for coupling said radiant acting means to said radiant energy translating device comprising a pair of transmission lines each coupled to one of said radiant acting means, matching resistive impedances terminating each of said transmission lines, said transmission lines having a given impedance, circuit means coupling said transmission lines to said device, said circuit means having an input impedance relatively large compared to the transmission line impedance to voltages having a predetermined amplitude and phase relationship at the points at which said circuit means is coupled to the transmission lines and having a lesser input impedance to voltages at said points differing from said predetermined phase relationship, and means for variably controlling the phase of energy transferred between said circuit means and said two radiant acting means.

5. In a directional shiftable radiant acting system including two spaced radiant acting means and a radiant energy translating device, means for coupling said radiant acting means to said radiant energy translating device comprising a pair of transmission lines each coupled to one of said radiant acting means, matching impedances terminating each of said transmission lines, said transmission lines having a given impedance, circuit means coupling said transmission lines to said device, said circuit means having an input impedance relatively large compared to the transmission line impedance with respect to equal, in phase voltages at the points at which said circuit means is coupled to the transmission lines and having a lesser input impedance with respect to voltages of equal amplitude which are out of phase, and means for variably controlling the phase of energy transferred between said circuit means and said two radiant acting means.

6. The system according to claim 5 wherein said circuit means includes a pair of closely coupled coils each being arranged in series between said translating device and one of said transmission lines, said coils being arranged to produce reenforcing fields in response to said equal, in phase voltages.

7. In a directional shiftable radiant acting system including two spaced radiant acting means and a radiant energy translating device, means for coupling said radiant acting means to said radiant energy translating device comprising a pair of transmission lines each coupled to one of said radiant acting means matching impedances terminating each of said transmission lines, said transmission lines having a given impedance, circuit means, coupled to said translating device, and means continuously variably coupling said circuit means to said transmission lines along different points thereof to couple said translating device in variable phase with respect to said two radiant acting means, said circuit means having an input impedance relatively large compared to the transmission line impedance with respect to voltages having a predetermined amplitude and phase relationship at the points at which said circuit means is coupled to the transmission lines and having a lesser input impedance with respect to voltages differing from said predetermined phase relationship.

8. The system according to claim 5 wherein said circuit means includes a pair of closely coupled coils each having arranged in series between said translating device and one of said transmission lines, said coils being arranged to produce reenforcing fields in response to said voltages having said predetermined amplitude and phase relationship.

9. A radio direction finder system comprising two space antenna means, a pair of transmission lines each coupled at one end thereof to one of said antenna means, a pair of matching impedances each terminating one of the other ends of said transmission lines, a radio receiver means, circuit means coupled to the input of said receiver means, means continuously variably coupling said circuit means to said transmission lines along different points thereof to couple said receiver in variable phase relationship with respect to said two antenna means, and indicator means coupled to the output of said receiver means, means for producing a trace line on said indicator means in accordance with the phasing between said receiver means and said two antenna means, and means for deflecting said trace line in response to energy received in said receiver means, said circuit means having an input impedance relatively large compared to the transmission line impedance with respect to equal, in phase voltages at the points at which said circuit means is coupled to the transmission lines and having a receiver input impedance with respect to other phase relationships of said voltages, said indicator means being arranged to produce a directional indication in response to equal, in phase voltages at said coupling points.

10. A direction finding system according to claim 9, wherein said circuit means includes a pair of closely coupled coils each being arranged in series between said receiver means and one of said transmission lines, said coils being arranged to produce reenforcing fields in response to said equal, in phase voltages.

11. In a directional shiftable radiant acting system including two spaced radiant acting means and a radiant energy translating device, means for coupling said radiant acting means to said radiant energy translating device comprising two phase control means each coupled to one of said radiant acting means, a pair of matching impedance means, a pair of transmission lines each having one end thereof coupled to one of said phase-control means and the other end thereof terminating in one of said impedance transmission lines having a given impedance, circuit means coupling said transmission lines to said device, said circuit means having an input impedance relatively large compared to the transmission line impedance with respect to equal, in phase voltages at the points at which said circuit means is coupled to the transmission lines and a lesser input impedance with respect to said voltages in outer phase relation and means for simultaneously controlling both said phase control means to vary the phase relation of the translating device in relation to both said radiant acting means.

12. In a radio direction finder system including two spaced radiant acting means and a direction finding receiver means to said radiant acting means comprising two phase control means each coupled to one of said radiant acting means, a pair of resistive impedance means, a pair of transmission lines each having one end thereof coupled to one of said phase control means and the other end thereof terminating in one of said impedance means, said transmission lines having a given impedance, circuit means coupling said transmission lnes to said receiver means, said circuit means having an input impedance relatively large compared to the transmission line impedance with respect to equal, in phase voltages at the points at which said circuit means is coupled to the transmission lines and having a lesser input impedance with respect to said voltages out of phase, means for simultaneously controlling both said phase control means to vary the phase relation of the receiver means to both said radiant acting means, and an indicator coupled to the output of said receiver and arranged to produce an indication in response to said equal, in phase voltages.

MORTON FUCHS.